(12) United States Patent
Wolf et al.

(10) Patent No.: US 8,054,118 B2
(45) Date of Patent: Nov. 8, 2011

(54) SYSTEM AND METHOD

(75) Inventors: Harald Wolf, Ubstadt-Weiher (DE);
Christian Treier, Karlsruhe (DE); Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 0 days.

(21) Appl. No.: 12/281,468

(22) PCT Filed: Jan. 27, 2007

(86) PCT No.: PCT/EP2007/000712
§ 371 (c)(1),
(2), (4) Date: Sep. 2, 2008

(87) PCT Pub. No.: WO2007/098836
PCT Pub. Date: Sep. 7, 2007

(65) Prior Publication Data
US 2009/0039933 A1   Feb. 12, 2009

(30) Foreign Application Priority Data

Mar. 2, 2006 (DE) .................. 10 2006 010 256

(51) Int. Cl.
*H03L 7/00* (2006.01)
(52) U.S. Cl. .................................................. 327/163
(58) Field of Classification Search .......... 327/163
See application file for complete search history.

(56) References Cited

U.S. PATENT DOCUMENTS

2003/0200025 A1   10/2003   Ross
2005/0185747 A1*  8/2005   White ..................... 375/375

FOREIGN PATENT DOCUMENTS

| DE | 102 22 490 | 11/2003 |
|---|---|---|
| DE | 103 49 242 | 4/2005 |
| EP | 1 744 443 | 1/2007 |
| JP | 57-88871 | 6/1982 |
| JP | 57-126269 | 8/1982 |
| JP | 11-206043 | 7/1999 |
| JP | 2002-67747 | 3/2002 |
| JP | 2005-313884 | 11/2005 |
| WO | WO 2005/096485 | 10/2005 |

OTHER PUBLICATIONS

English translation of JP-2005313884.*
International Search Report, PCT/EP2007/000712, dated Aug. 28, 2007.
International Bureau, Translation of International Preliminary Report on Patentability (including Written Opinion of the International Searching Authority), International Patent Application No. PCT/EP2007/000712, Oct. 14, 2008.

* cited by examiner

*Primary Examiner* — Lincoln Donovan
*Assistant Examiner* — Daniel Rojas
(74) *Attorney, Agent, or Firm* — Kenyon & Kenyon LLP

(57) ABSTRACT

System and method, including path sections,
each path section including a supply line into which a medium-frequency current is able to be injected by an infeed assigned to the particular path section,
each infeed encompassing a control circuit,
a first one of the control circuits transmitting a clock signal for the synchronization of the additional infeeds thereto.

23 Claims, 4 Drawing Sheets

SYSTEM AND METHOD

FIELD OF THE INVENTION

The present invention relates to a system and a method.

BACKGROUND INFORMATION

Japanese Published Patent Application No. 2002067747 describes a system for contactless energy transmission, in which a plurality of path sections are energized by different infeeds in a synchronized manner. In the process, a clock signal is transmitted from a master path section to a slave path section using light. It is disadvantageous in this context that the phase relation of currents must be determined, in particular in a complex manner using current sensors.

SUMMARY

Example embodiments of the present invention provide a system of this type such that a simplest and most cost-effective synchronization is able to be achieved.

Among features of example embodiments of the present invention in this system are that it includes path sections,
each path section encompassing a supply line into which a medium-frequency current is able to be injected from an infeed assigned to the particular path section,
each infeed including a control circuit,
a first one of the control circuits, in particular the master, transmitting a clock signal for the synchronization of the additional infeeds thereto, in particular the slave.

The currents of the path sections may be able to be synchronized without the need to detect a current value and without the need to determine the phase relation of a current. It may therefore suffice to achieve synchronization in the digital component of the inverters and to utilize the advantageous characteristics of gyrators, i.e., the independence of the phase shift between input voltage and output current from the load.

As an alternative, the system of an example embodiment of the present invention includes at least one path section,
the path section encompassing a supply line into which a medium-frequency current is able to be injected from at least two infeeds,
each infeed including a control circuit,
a first one of the control circuits, in particular the master, transmitting a clock signal for the synchronization of the additional infeed thereto, in particular the slave.

Infeeds may be able to be switched in parallel without causing mutual interference.

The control circuit may be arranged as digital system. The synchronization of the output currents of the infeeds may be achievable by synchronizing the digital components of the infeeds. Thus, for instance, the control electronics for the output stage of an inverter, especially an intermediate circuit voltage-source converter, are able to be operated in synchronized fashion.

The synchronization may be based only on information that is available in the digital component of the infeed. The downstream electronic components may be arranged such that the output currents are able to be synchronized despite the complex circuitry.

The infeed may include a medium-frequency voltage source able to be operated in pulse-width-modulated manner, whose output voltage is suppliable to a voltage-current converter, in particular a gyrator, whose output current may be injected into the supply line. An inverter may be used to realize a medium-frequency voltage source. The current source is therefore realizable by simple conversion of the voltage source into a current source with passive elements. Since the synchronization was implemented in the digital component of the inverters, there is no need to use a current detection for synchronization purposes. Therefore, an especially simple and cost-effective synchronization is achieved.

The voltage-current converter and/or the inductivity of the supply line with associated capacitances may be substantially adapted in resonance to the medium frequency. The phase shift may be constant and independent of the connected consumers.

Consumers may be supplied inductively from the supply line, the consumers including a secondary coil, in particular, which is able to be coupled inductively to the supply line arranged as a primary conductor, a capacitance being connected to the secondary coil in series or in parallel, the resonant frequency, in particular, substantially being similar to the medium frequency. The consumers may be suppliable in a contactless manner.

The control circuit may be provided to generate the pulse-width-modulated control signals of the output stage. Conventional inverters may require only minimal modifications.

The control circuit of each further infeed may include a device for varying the pulse-width modulation period, the period duration being varied as a function of the phase deviation of the clock signal of the first infeed from the pulse-width modulation signal. Synchronization may be achievable in a simple and cost-effective manner.

The amount of the change of the pulse-width modulation period per period may be below a value, especially for limiting the frequency deviation from the clock signal frequency. The frequency may not be subject to abrupt changes and that large frequency deviations are therefore avoided.

The output frequency of an oscillator circuit of the additional infeed may be varied as a function of the phase deviation of the clock signal of the first infeed from the pulse-width modulation signal, in particular in order to vary the basic clock frequency for a microcontroller of the additional infeed. Synchronization may be achievable in a simple and cost-effective manner.

The period duration of the time characteristic of a counter reading may be varied as a function of the phase deviation of the clock signal of the first infeed from the pulse-width modulation signal. Synchronization may be achievable in a simple and cost-effective manner.

The clock signal may be transmitted bus system, in particular field bus system and/or Ethernet, transmits. Conventional bus systems may be used.

Additional data beyond the clock signal may be transmittable with the aid of the bus system. Additional security or control data are able to be transmitted.

Among features in the method for operating a system are that a first infeed transmits a clock signal to additional infeeds,
the clock signal in the first infeed being generated such that it is synchronous with control signals of an output stage, in particular an output stage that includes electronic power semiconductors to generate an output voltage. The synchronization may be achievable in the digital component.

The clock signal and the switching instants of the control signals may be derived from the same digital, time-determining device, in particular the counter. The implementation may be possible in simple and cost-effective software.

The additional infeeds may generate pulse-width-modulated control signals such that synchronization of the control signals, in particular the pulse-width-modulation signals, with the clock signal is achieved. The control signals, e.g., the PWM control signals, may be implementable in synchronism, without special additional effort.

A controller may be used to achieve the synchronization. The controller is supplied with a phase differential, in particular. The period duration of a clock generator, such as an oscillator circuit or timer, may be variable on the basis of the phase differential as a system deviation, and the synchronization may be achievable in this manner. The clock generator is realizable in software and/or hardware.

The period duration of the pulse-width modulation, i.e., the PWM period duration, may be influenced by the output of the controller. Slight influencing of the PWM period duration may be sufficient to achieve the synchronization.

The particular phase differential may be determined from the phase of the particular pulse-width modulation signal and the clock signal. Flanks of the signals, for example, and/or a comparison with characteristic values may be utilized to determine the phase, and a determination of the phase differential is thus able to be implemented in a simple, yet very precise manner.

The frequency variation or period duration variation may be implemented by the controller only at a limited maximum rate. The frequency of the slave may remain substantially unchanged. The small, negligible frequency detunings change the frequency only to an insignificant extent yet are sufficient to adapt the phase and the frequency, as well.

Figure 1:
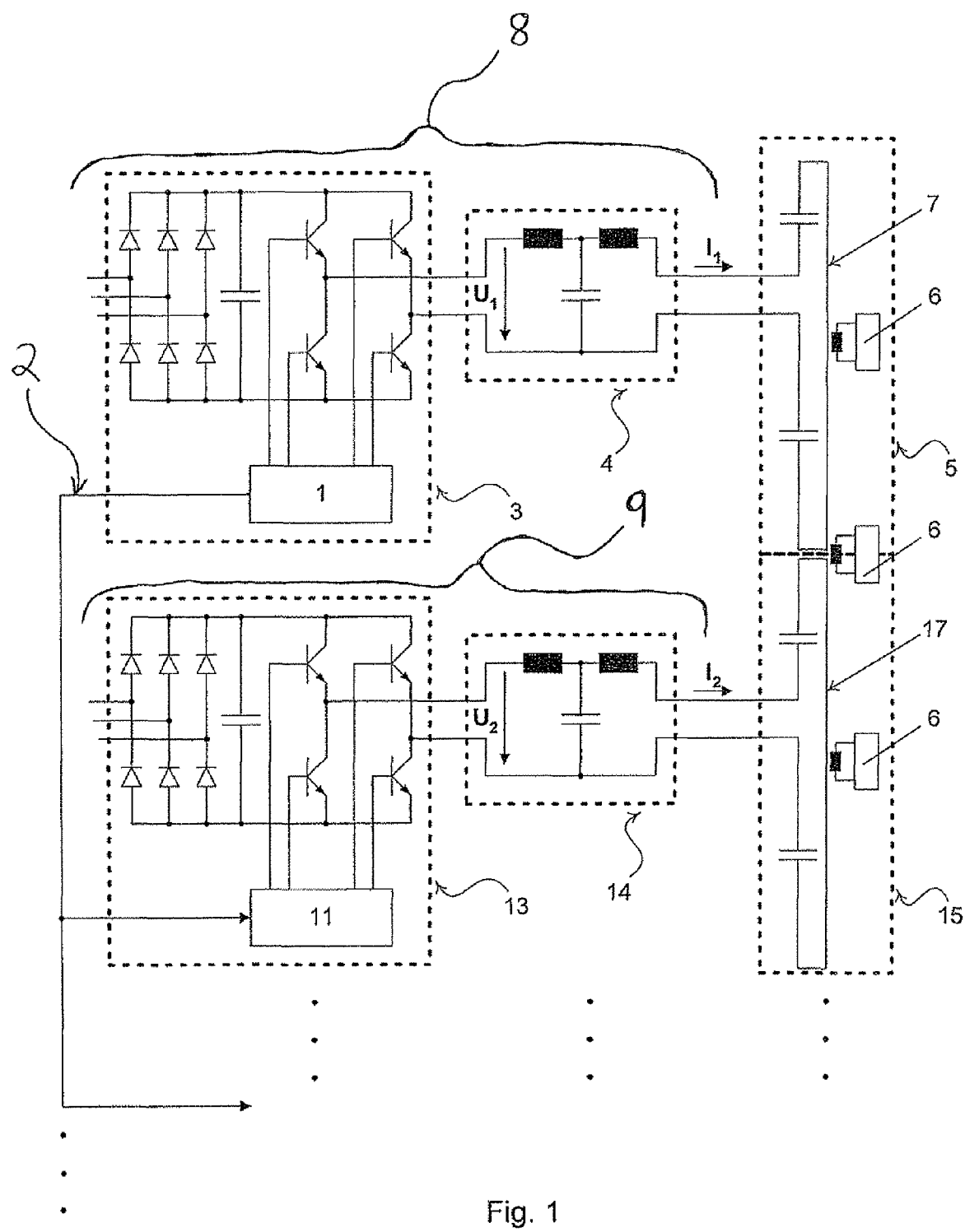
FIG. 1 illustrates a schematic diagram of a system according to an example embodiment of the present invention.

LIST OF REFERENCE CHARACTERS 1 control circuit
2 line for transmitting a clock signal
3 voltage-source converter
4 voltage-current converter
5 first path section
6 inductively suppliable consumer
7 primary conductor
8 infeed
9 infeed
11 control circuit
13 voltage-controlled converter
14 voltage-current converter
15 first path section
16 inductively suppliable consumer
17 primary conductor.

DETAILED DESCRIPTION

The present invention will now be explained in greater detail with reference to the Figures.

A system according to an example embodiment of the present invention is shown schematically in FIG. 1. The inductively suppliable consumers 6 are able to be moved along a primary conductor. Furthermore, a first path section 5 is shown whose primary conductor 7 is able to be supplied from an infeed 8, i.e., from voltage-source converter 3 via voltage-current converter 4. Voltage-source converter 3 may be provided as medium-frequency voltage source having an output frequency of between 1 and 100 kHz, in particular.

Voltage-source converter 3 includes a rectifier supplied by the network, to which a capacitor, i.e., an intermediate circuit capacitor, is post-connected, from which the output stage, especially an inverter, is able to be supplied.

The inverter feeds voltage-current converter 4, which in this instance is implemented in the form of what is referred to as gyrator. The voltage-source behavior of converter 3 is transformed into a current-source behavior at the output of voltage-current converter 4. At voltage-current converter 4, the amplitude of its alternating current output is proportional to the amplitude of its alternating-current input, irrespective of the consumers.

Thus, a current is able to be injected into the primary conductor of first path section 5; to adapt the resonant frequency of the inductivity of the primary conductor and capacitors to the medium frequency, the latter are provided in path section 5.

Second path section 15 once again includes a primary conductor 17, which is able to be supplied by an infeed 9, i.e., via voltage-current converter 14 in the same manner from converter 13, which is suppliable from the network, in particular a three-phase current-supply network.

To ensure a continuous supply of consumers 6 in the transition from first path section 5 to second path section 15, the currents of the primary conductors (7, 17) must be in mutual synchronism, i.e., agree in frequency and phase relation to the greatest extent possible.

The synchronization is achieved in that control circuit 1 of first converter 3 and control circuit 11 of additional converter 13 and possibly additional control circuits 11 are synchronized by additional converters.

A line 2 for transmitting a clock signal is provided to this end. The clock signal is generated by first control circuit 1 and transmitted to all additional control circuits 11.

In additional exemplary embodiments according to the present invention, the transmission with the aid of a bus system may be provided, which is implementable, for example, as field bus, such as a CAN bus, Profibus or Interbus.

The additional control circuits 11 in FIG. 1 are arranged such that the output voltages of the converters (3, 13) run in synchronism, so that the current in the primary conductor associated with the particular path section is synchronous as well.

For the voltage-current converters are arranged such that the phase shift, i.e., the relative phase relation, of the input voltage to the output current is constant and independent of the load, i.e., the consumers.

Figure 2:
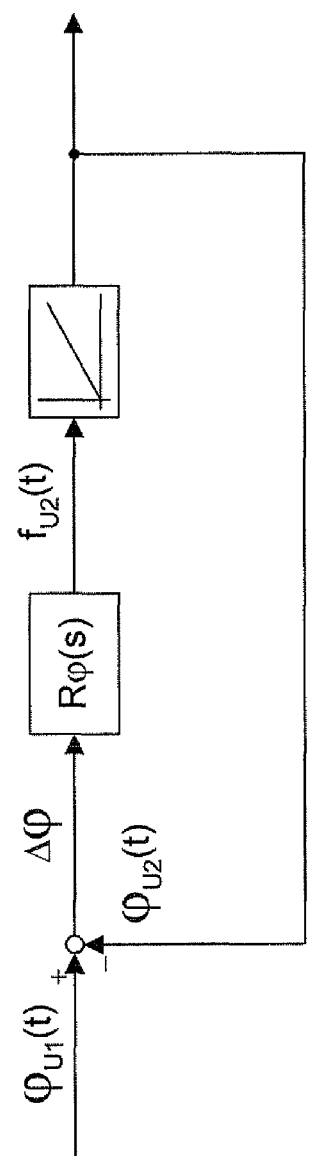
FIG. 2 illustrates a block diagram of establishing synchronization of a device according to an example embodiment of the present invention.

In FIG. 2, a device for establishing the synchronization is shown in greater detail. The clock signal coming from control circuit 1 is synchronous with output voltage $U_1$, of converter 3.

The associated information about the phase relation is denoted as $\phi_{U_1}(t)$ in FIG. 2 and is compared as setpoint value to the actual value, i.e., phase relation $\phi_{U_2}(t)$ of output voltage $U_2$ of converter 13. System deviation $\Delta\phi$ is forwarded to the controller $R\phi(s)$, which generates frequency $f_{U_2}(t)$ of medium-frequency voltage $U_2$. Phase relation $\phi_{U2}(t)$ results from the integration of this frequency $f_{U2}(t)$.

That is to say, the phase relation of the output voltages of the converters (1, 13) is synchronized by the control structure of converter 13 described in FIG. 2. Thus, not only are the frequencies in synchronism but the phases of the output voltages are as well. From this it then also follows that the currents of the primary conductors are in synchronism.

For the voltage-current converters (4, 14) are adjusted to the medium frequency. Especially when the converter is implemented as gyrator or similar circuit type, the inductivities and capacities are dimensioned such that the resonant frequency of this gyrator or similar circuit type corresponds, or at least substantially corresponds, to the medium frequency.

In further exemplary embodiments according to the present invention, apart from the clock signal, additional data are transmittable via line 2 as well, in particular the bus system.

In further exemplary embodiments according to the present invention, a P-controller, a PI controller or a PID controller may be used as controller. Other conventional controllers may be provided as well.

Figure 3A:
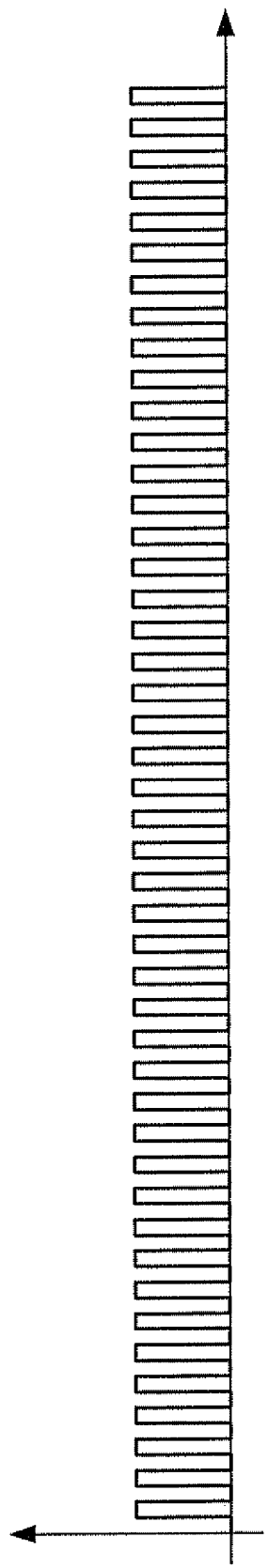
FIG. 3a illustrates a graph of a basic clock signal generated by an oscillator according to an example embodiment of the present invention.
Figure 3B:
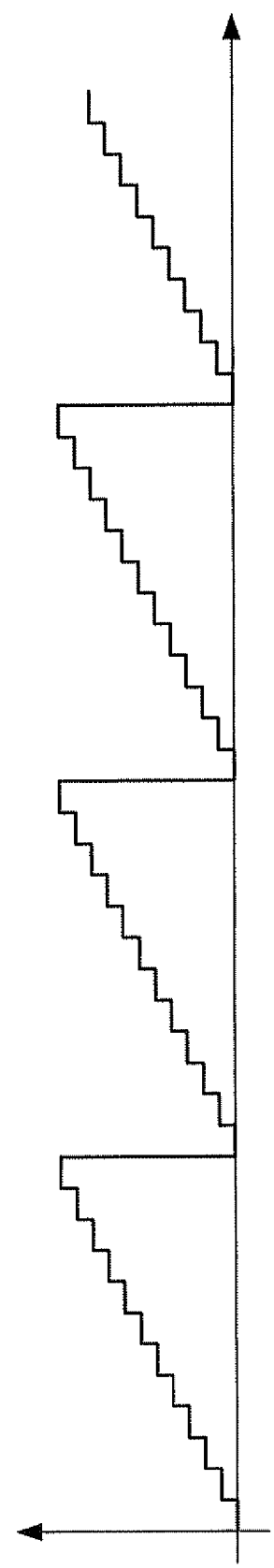
FIG. 3b illustrates a graph of a generated counter reading compared to four specifiable values according to an example embodiment of the present invention.
Figure 3C:
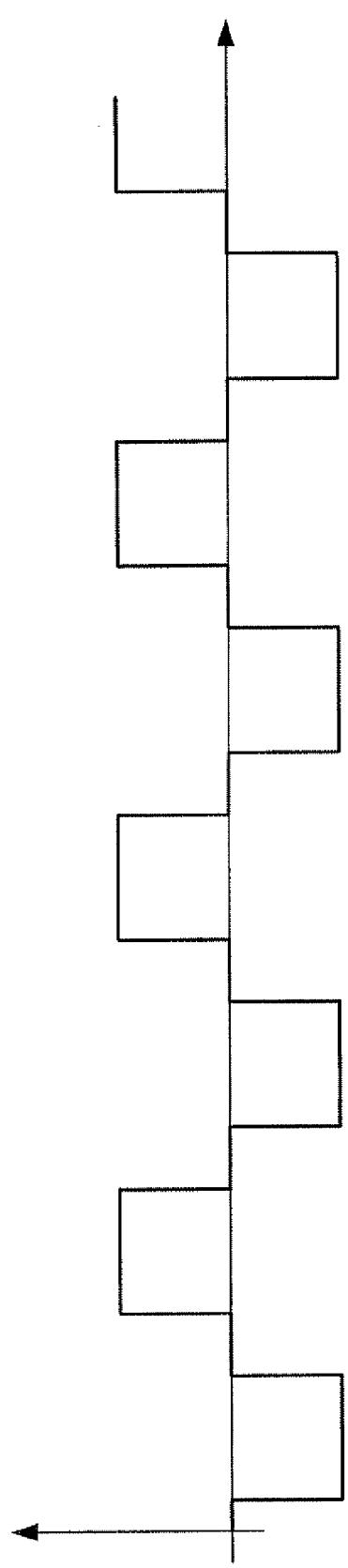
FIG. 3c illustrates a graph of a generated output voltage according to an example embodiment of the present invention.
Figure 3D:
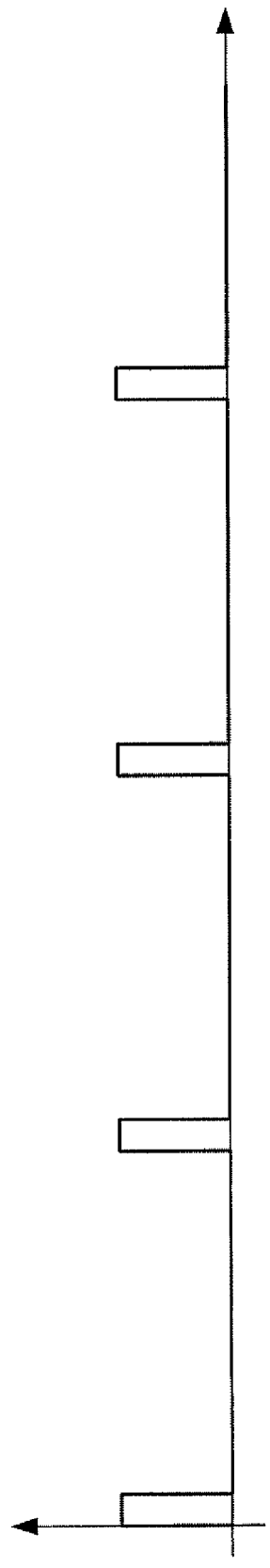
FIG. 3d illustrates a graph of a generated clock signal according to an example embodiment of the present invention.

An additional exemplary embodiment according to the present invention is shown in FIGS. 3a to 3d. It is a time-discrete embodiment. The control circuit includes an oscillator, which generates a basic clock signal as shown in FIG. 3a. The generation is implemented with the aid of, for example, an oscillator circuit which includes a quartz. From this, a counter reading is generated, which is illustrated in FIG. 3b, which is compared to four specifiable values with the aid of comparators. The four comparison results are used to determine the switching instants for the output stage, and output voltage U1 is generated in this manner, which is illustrated in FIG. 3c. Via an additional comparison with a further value, the clock signal according to FIG. 3d is generated, which therefore is in synchronism with the time characteristic of the counter reading according to FIG. 3b and has an identical phase relation as well.

Converter 13 also has an oscillator circuit, clocks a counter, and thus once again generates a time characteristic of a counter reading. Depending on the phase relation of the clock signal to the time characteristic of the counter reading, the period duration is extended or shortened.

To this end, in the period that follows the flank of the clock signal, the period duration or the overflow value of the counter is prolonged or shortened by one. In this manner, the phase relation of the slave converter follows the phase relation of the output voltage of converter 3, i.e., the master, at a limited rate of change.

In additional exemplary embodiments according to the present invention, the oscillator circuit is arranged as a VCO circuit. The frequency of the oscillator circuit thus is tunable as a function of a signal voltage to be applied. Therefore, converter 13 need only to be arranged such that the controller induces a signal voltage that modifies the frequency of the VCO on the basis of a phase comparison between the clock signal and a voltage characteristic of converter 13. The software and/or hardware need not be changed to any significant degree, and finer grading is able to be provided.

In further exemplary embodiments according to the present invention, the synchronization of the infeeds is utilized for the parallel interconnection of the outputs of the voltage-current converters to supply only one shared path section.

What is claimed is:

1. A system, comprising:
    path sections, each path section including a supply line into which a medium-frequency current of between 1 and 100 kHz is injectable by a respective infeed assigned to the particular path section,
    wherein each infeed includes a control circuit, a first one of the control circuits arranged as a master and configured to transmit a clock signal for synchronization of additional infeeds arranged as a slave,
    wherein each infeed includes a medium-frequency voltage source operable in a pulse-width-modulated manner, as well as at least one of (a) a voltage-current converter and (b) a gyrator, an output voltage of the medium-frequency voltage source suppliable to the at least one of a voltage-current converter and a gyrator, an output current of the at least one of a voltage-current converter and a gyrator injectable into the supply line,
    wherein the current of the path sections is synchronized without detecting a current value.

2. A system, comprising:
    at least one path section including a supply line into which a medium-frequency current of between 1 and 100 kHz is injectable by at least two infeeds,
    wherein each infeed includes a control circuit, a first one of the control circuits arranged as a master and configured to transmit a clock signal for synchronization of additional infeeds arranged as a slave,
    wherein each infeed includes a medium-frequency voltage source operable in a pulse-width-modulated manner, as well as at least one of (a) a voltage-current converter and (b) a gyrator, an output voltage of the medium-frequency voltage source suppliable to the at least one of a voltage-current converter and a gyrator, an output current of the at least one of a voltage-current converter and a gyrator injectable into the supply line,
    wherein the current of the at least one path section is synchronized without detecting a current value.

3. The system according to claim 2, wherein the control circuit is arranged as a digital system.

4. The system according to claim 2, wherein the synchronization is based only on information available in a digital component of the infeed.

5. The system according to claim 2, wherein at least one of (a) the voltage-current converter and (b) an inductivity of the supply line with associated capacitances is substantially adapted in resonance to the medium frequency.

6. The system according to claim 2, wherein consumers are suppliable inductively from the supply line, the consumers including a secondary coil inductively couplable to the supply line arranged as primary conductor, a capacitance being connected to the secondary coil one of (a) in series and (b) in parallel such that a resonant frequency is substantially similar to the medium frequency.

7. The system according to claim 2, wherein the control circuit is adapted to generate pulse-width modulated control signals of an output stage.

8. The system according to claim 1, wherein the control circuit of each additional infeed includes a device configured to vary a pulse-width modulation period as a function of a phase deviation of the clock signal of the first infeed from a pulse-width modulation signal.

9. The system according to claim 8, wherein an amount of change in the pulse-width modulation period per period is below a value for limiting a frequency deviation from a clock signal frequency.

10. The system according to claim 1, wherein an output frequency of an oscillator circuit of the additional infeed is variable as a function of a phase deviation of the clock signal of the first infeed from a pulse-width modulation signal for varying a basic clock frequency for a microcontroller of the additional infeed.

11. The system according to claim 1, wherein a period duration of a time characteristic of a counter reading is variable as a function of the phase deviation of the clock signal of the first infeed from a pulse-width modulation signal.

12. The system according to claim 2, wherein the clock signal is transmittable by at least one of (a) a bus system, (b) a field bus system, and (c) an Ethernet.

13. The system according to claim 12, wherein, in addition to the clock signal, further data are transmittable with the aid of the bus system.

14. A method for operating a system, comprising:
generating a clock signal in a first infeed, the clock signal synchronous with control signals of an output stage of a medium-frequency voltage source of the infeed, the output stage including electronic power semiconductors for generating an output voltage, a frequency of the voltage source between 1 and 100 kHz; and
transmitting the clock signal by the first infeed to additional infeeds;
wherein each infeed includes a respective medium-frequency voltage source operable in a pulse-width-modulated manner, as well as at least one of (a) a voltage-current converter and (b) a gyrator, an output voltage of the medium-frequency voltage source suppliable to the at least one of a voltage-current converter and a gyrator, an output current of the at least one of a voltage-current converter and a gyrator injectable into a supply line of a path section,
wherein the current of the path section is synchronized without detecting a current value.

15. The method according to claim 14, wherein the clock signal and switching instants of the control signals are derived from a same digital, time-determining device.

16. The method according to claim 15, wherein the device includes a counter.

17. The method according to claim 14, further comprising generating, by the additional infeeds, pulse-width modulated control signals such that a synchronization is achieved between the pulse-width modulation signals and the clock signal.

18. The method according to claim 17, wherein the synchronization is achieved by a controller.

19. The method according to claim 18, further comprising forwarding a phase differential to the controller.

20. The method according to claim 18, wherein a frequency of an oscillator circuit is influenced by an output of the controller.

21. The method according to claim 18, wherein a pulse-width modulation period is influenced by an output of the controller.

22. The method according to claim 17, wherein an individual phase differential is determined from a phase of a particular pulse-width modulation signal and the clock signal.

23. The method according to claim 18, wherein the controller implements at least one of (a) a frequency variation and (b) a period duration variation only at a limited maximum rate.

* * * * *